United States Patent
Miura et al.

(10) Patent No.: US 10,400,174 B2
(45) Date of Patent: Sep. 3, 2019

(54) MULTI-LAYER INSULATED WIRE AND METHOD OF MANUFACTURING THE SAME

(71) Applicant: Hitachi Metals, Ltd., Minato-ku, Tokyo (JP)

(72) Inventors: Tsuyoshi Miura, Tokyo (JP); Tamotsu Kibe, Tokyo (JP); Makoto Iwasaki, Tokyo (JP); Yoshiaki Nakamura, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/260,433

(22) Filed: Jan. 29, 2019

(65) Prior Publication Data

US 2019/0241812 A1 Aug. 8, 2019

(30) Foreign Application Priority Data

Feb. 7, 2018 (JP) .................. 2018-020156

(51) Int. Cl.
*H01B 7/295* (2006.01)
*C09K 21/14* (2006.01)
*H01B 3/30* (2006.01)

(52) U.S. Cl.
CPC .............. *C09K 21/14* (2013.01); *H01B 3/30* (2013.01); *H01B 7/295* (2013.01); *C08L 2201/02* (2013.01); *C08L 2203/202* (2013.01)

(58) Field of Classification Search
CPC ....... H01B 7/295; H01B 3/30; C08L 2201/02; C08L 2203/202; C09K 21/14
USPC ...................................................... 174/110 R
See application file for complete search history.

(56) References Cited

U.S. PATENT DOCUMENTS

| 6,200,679 B1 | 3/2001 | Hase et al. | |
|---|---|---|---|
| 2008/0053696 A1* | 3/2008 | Nakayama | H01B 7/295 174/393 |
| 2010/0078196 A1 | 4/2010 | McLaughlin et al. | |
| 2014/0138118 A1* | 5/2014 | Fujimoto | H01B 3/421 174/120 SR |
| 2015/0030853 A1 | 1/2015 | Iwasaki et al. | |

(Continued)

FOREIGN PATENT DOCUMENTS

| JP | 2000-109638 A | 4/2000 |
|---|---|---|
| JP | 2015-21120 A | 2/2015 |
| JP | 2016-204471 | 12/2016 |

OTHER PUBLICATIONS

Corresponding European Search Report dated Jun. 25, 2019 (14 pages).

(Continued)

*Primary Examiner* — Sherman Ng
(74) *Attorney, Agent, or Firm* — Crowell & Moring LLP

(57) ABSTRACT

In a multi-layer insulated wire including: a conductor; an inner layer formed in periphery of the conductor; and an outer layer formed in periphery of the inner layer, the inner layer is made of a resin composition containing a base polymer containing polyolefin as a main component, and the outer layer is made of a resin composition containing a base polymer containing polyolefin as a main component so as to contain 80 or more and 250 or less parts by mass of metallic hydroxide per 100 parts by mass of the base polymer. The multi-layer insulated wire having an expansion start temperature of the outer layer that is equal to or lower than 344° C. is used.

8 Claims, 1 Drawing Sheet

10: MULTI-LAYER INSULATED WIRE
1: CONDUCTOR
2: INNER LAYER
3: OUTER LAYER

(56) References Cited

U.S. PATENT DOCUMENTS

| | | | |
|---|---|---|---|
| 2016/0125973 A1 | 5/2016 | Iwasaki et al. | |
| 2017/0011822 A1* | 1/2017 | Nakamura | H01B 7/295 |
| 2017/0032867 A1 | 2/2017 | Iwasaki et al. | |
| 2017/0098492 A1* | 4/2017 | Iwasaki | H01B 3/28 |
| 2017/0365373 A1* | 12/2017 | Hirano | H01B 3/10 |
| 2018/0075944 A1* | 3/2018 | Iwasaki | C08J 7/047 |

OTHER PUBLICATIONS

Oleh Shevchuk et al. "Flame-Retardant Polymer Composites on the Basis of Modified Magnesium Hydroxide", Chemistry& Chemical Technology, vol. 9, No. 2, 2015, pp. 149-155.

Graphit Kropfmühl et al., "Expandable Graphite", Jul. 31, 2013 (2 pages).

\* cited by examiner

MULTI-LAYER INSULATED WIRE AND METHOD OF MANUFACTURING THE SAME

CROSS-REFERENCE TO RELATED APPLICATION

The present application claims priority from Japanese Patent Application No. 2018-020156 filed on Feb. 7, 2018, the content of which is hereby incorporated by reference into this application.

TECHNICAL FIELD OF THE INVENTION

The present invention relates to a halogen-free multi-layer insulated wire and a method of manufacturing the same.

BACKGROUND OF THE INVENTION

Insulated wires used as internal wirings of electronic machinery are required to have a flame-retardant property in order to avoid spread of fire through electrical wires in fire accident of the machinery and others. Standards for the flame-retardant properties of internal wiring materials are defined by, for example, UL758 standards of the U.S. and others.

Meanwhile, in Europe where railroad vehicle networks have been developed, adoption of regional uniform standards that are called EN standards (European standards) has been spread, and it has been required to use electrical wires and cables each having a heat resistance property, a flame-retardant property, a hydrolysis resistance property, an abrasion resistance property and a low smoke-producing property, and each using a halogen-free material not containing halogen for a covering material.

As the halogen-free material, polyolefin-based resins such as polyethylene and polypropylene are cited. However, usage of only the polyolefin-based resin is insufficient for the flame-retardant property, and therefore, a method of adding a halogen-free flame retardant is used. As the halogen-free flame retardant, metallic hydroxides such as magnesium hydroxide and aluminum hydroxide are cited (Japanese Patent Application Laid-Open Publication No. 2000-109638 (Patent Document 1)).

A cross-linked material obtained by cross-linking of halogen-free cross-linking resin composition has the flame-retardant property and a mechanical property, and besides, is excellent in a fuel resistance property, a cold resistance property and a room-temperature storable property. Therefore, it is known that such a cross-linked material can be suitably used for an insulating layer of an insulated wire and a sheath (Japanese Patent Application Laid-Open Publication No. 2015-21120 (Patent Document 2)).

SUMMARY OF THE INVENTION

However, in such a cross-linked electric wire using a resin composition filled with metallic hydroxide as the covering material, particularly when metallic hydroxide having a small BET specific surface area is used, there is a problem of failing this material to pass a vertical flame test (VFT) although a workability is good.

Accordingly, an object of the present invention is to provide a multi-layer insulated wire having an excellent flame-retardant property even when metallic hydroxide having a small BET specific surface area is used.

The present inventors have found out that a multi-layer insulated wire having an excellent flame-retardant property passing the vertical flame test (VFT) that is a flame-retardant test in conformity with EN60332-1-2 can be obtained by using a resin composition containing polyolefin as a main component so as to contain 80 or more and 250 or less parts by mass of metallic hydroxide per 100 parts by mass of a base polymer, and by causing an expansion start temperature of an outer layer to be equal to or lower than 344° C.

That is, the present invention is to provide the following multi-layer insulated wire.

[1] In a multi-layer insulated wire having: a conductor; an inner layer formed in periphery of the conductor; and an outer layer formed in periphery of the inner layer, the inner layer is made of a resin composition containing a base polymer containing polyolefin as a main component, the outer layer is made of a resin composition containing a base polymer containing polyolefin as a main component so as to contain 80 or more and 250 or less parts by mass of metallic hydroxide per 100 parts by mass of the base polymer, and an expansion start temperature of the outer layer is equal to or lower than 344° C.

[2] In the multi-layer insulated wire described in the item [1], a BET specific surface area of the metallic hydroxide is equal to or larger than 1 $m^2/g$ and equal to or smaller than 10 $m^2/g$.

[3] In the multi-layer insulated wire described in the item [1] or [2], 1 or more and 10 or less parts by mass of a foaming agent per 100 parts by mass of the base polymer of the outer layer is contained.

[4] In the multi-layer insulated wire described in the item [3], the foaming agent is an expandable graphite.

[5] In a method of manufacturing a multi-layer insulated wire, the method includes a step of forming, in periphery of a conductor, an inner layer made of a resin composition containing a base polymer containing polyolefin as a main component, a step of forming, in periphery of the inner layer, an outer layer made of a resin composition containing a base polymer containing polyolefin as a main component so as to contain 80 or more and 250 or less parts by mass of metallic hydroxide per 100 parts by mass of the base polymer, and a step of cross-linking the outer layer so that an expansion start temperature of the outer layer is equal to or lower than 344° C.

[6] In the method of manufacturing the multi-layer insulated wire described in the item [5], in the step of cross-linking the outer layer, the outer layer is irradiated with electron beam whose irradiance level is equal to or higher than 20 KGy and lower than 70 KGy.

[7] In a method of manufacturing a multi-layer insulated wire, the method includes a step of forming, in periphery of a conductor, an inner layer made of a resin composition containing a base polymer containing polyolefin as a main component, a step of forming, in periphery of the inner layer, an outer layer made of a resin composition containing a base polymer containing polyolefin as a main component so as to contain 80 or more and 250 or less parts by mass of metallic hydroxide per 100 parts by mass of the base polymer and so as to contain 1 or more and 10 or less parts by mass of a foaming agent per 100 parts by mass of the base polymer, and a step of cross-linking the outer layer so that an expansion start temperature of the outer layer is equal to or lower than 344° C.

[8] In the method of manufacturing the multi-layer insulated wire described in the item [7], in the step of cross-linking the outer layer, the outer layer is irradiated with electronic beam whose irradiance level is equal to or higher than 70 KGy and equal to or lower than 150 KGy.

According to the present invention, even when metallic hydroxide having a small BET specific surface area is used as a halogen-free flame retardant, a halogen-free multi-layer insulated wire having an excellent flame-retardant property and a method of manufacturing the halogen-free multi-layer insulated wire can be provided.

BRIEF DESCRIPTIONS OF THE DRAWINGS

DESCRIPTIONS OF THE PREFERRED EMBODIMENTS

Figure 1:
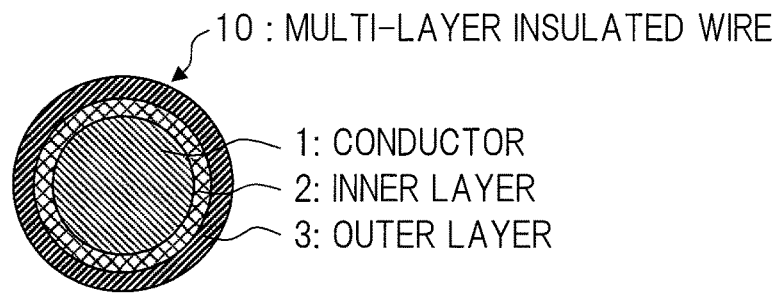
FIG. 1 is a lateral cross-sectional view showing an example of a multi-layer insulated wire of the present invention.

Hereinafter, a multi-layer insulated wire according to an embodiment of the present invention will be described with reference to the accompanying drawings. FIG. 1 is a cross-sectional view that is vertical to a longitudinal direction of the multi-layer insulated wire according to the embodiment of the present invention.

As shown in FIG. 1, a multi-layer insulated wire 10 according to the present embodiment has a conductor 1, an inner layer 2 formed in periphery of the conductor 1, and an outer layer 3 formed in periphery of the inner layer 2.

(Conductor)

As the conductor 1, not only general-use metallic wires such as a copper wire and a copper alloy wire but also an aluminum wire, a gold wire, a silver sire, and others can be used. Incidentally, a wire that is obtained by plating circumference of a metallic wire with tin, nickel or others may be used. Further, a stranded wire such as a bunch stranded conductor obtained by stranding metallic wires can be also used. Across-sectional area and an outer diameter of the conductor 1 can be appropriately changed in accordance with electrical characteristics required for the multi-layer insulated wire 10. For example, a cross-sectional area that is equal to or larger than 1 mm$^2$ and equal to or smaller than 10 mm$^2$ can be cited, and an outer diameter that is equal to or larger than 1.20 mm and equal to or smaller than 2.30 mm can be cited.

(Inner Layer)

The inner layer 2 functions as an insulating layer of the multi-layer insulated wire 10, and is made of a resin composition containing abase polymer containing polyolefin as a main component. The "main component" described in the present specification means a state in which a content of the polyolefin is equal to or larger than 50 weight % per 100 weight % of the base polymer. In the present invention, the base polymer of the inner layer means a polymer component contained in the inner layer.

As examples of the polyolefin used for the inner layer 2, polyethylene, polypropylene, ethylene-propylene copolymer, ethylene-propylene-diene copolymer, ethylene-($\alpha$-olefin) copolymer, ethylene-vinyl acetate copolymer, ethylene-acrylic acid ester copolymer, acid-modified substances of these materials and others can be cited. These components may be individually used or used in combination. Among these polyolefin resins, ethylene-vinyl acetate copolymer, ethylene-($\alpha$-olefin) copolymer and others can be preferably cited. A polymer component other than the above-described polyolefins may be contained in the resin composition of the present invention as long as effects of the invention are exerted. However, the above-described polyolefin is preferably contained to be equal to or larger than 60 weight % per 100 weight % of the base polymer, more preferably equal to or larger than 70 weight %, still more preferably equal to or larger than 90 weight %, most preferably equal to or larger than 100 weight %.

In addition to these components, an additive such as antioxidant, silane coupling agent, flame retardant, flame retardant aid, cross linker, cross-linking aid, cross-linking accelerator, surfactant, softener, inorganic filler, compatibilizer, stabilizer, ultraviolet absorber, and hindered amine light stabilizer (HALS) may be added if needed. In FIG. 1, the inner layer 2 of the multi-layer insulated wire has been explained as having the single layer structure. However, the structure is not limited to this, and may be a layered structure formed of a plurality of inner layers.

(Outer Layer)

The outer layer 3 contains a base polymer containing polyolefin as a main component, and is made of a resin composition containing metallic hydroxide.

Note that the base polymer of the outer layer according to the present invention means a polymer component contained in the outer layer 3.

As the polyolefin used for the outer layer 3, polyethylene, polypropylene and others are cited. Particularly, since a large amount of a frame retardant can be added, polyethylene, ethylene-vinyl acetate copolymer, ethylene-ethyl acrylate copolymer, ethylene-butyl acrylate copolymer, or ethylene-methyl acrylate copolymer may be preferably individually used or used in combination.

In consideration of dispersibility, the metallic hydroxide may be subjected to a surface treatment using a silane coupling agent, titanate coupling agent, a fat acid such as stearic acid, or others. As the metallic hydroxide, for example, magnesium hydroxide, aluminum hydroxide, hydrotalcite, calcium aluminate hydrate, calcium hydroxide, barium hydroxide and others are cited.

In consideration of the flame-retardant property, the content of the metallic hydroxide is preferably equal to or larger than 80 parts by mass and equal to or smaller than 250 parts by mass per 100 parts by mass of the base polymer forming the resin composition, more preferably equal to or larger than 150 parts by mass and equal to or smaller than 250 parts by mass, still more preferably equal to or larger than 150 parts by mass and equal to or smaller than 200 parts by mass.

Note that the BET specific surface area of the metallic hydroxide used in the present invention is cited to be, for example, equal to or larger than 1 m$^2$/g and equal to or smaller than 10 m$^2$/g, preferably equal to or larger than 3 m$^2$/g and equal to or smaller than 8 m$^2$/g, more preferably equal to or larger than 5 m$^2$/g and equal to or smaller than 7 m$^2$/g. Here, it is known that the workability such as MFI is better as the BET specific surface area of the metallic hydroxide is smaller. Here, the BET specific surface area of the metallic hydroxide is a value in conformity to JIS Z 8830:2013 "carrier gas method" measured by usage of nitrogen gas as an adsorbate. For example, the value can be measured by usage of a specific-surface-area/micropore-distribution measuring device "Flow Sorb" (produced by SHIMADZU CORPORATION).

To the resin composition used for the outer layer 3, an additive such as other flame retardant, flame retardant aid, filler, cross linker, cross-linking aid, plasticizer, metal chelator, softener, reinforcing agent, surfactant, stabilizer, ultraviolet absorber, light stabilizer, lubricant, antioxidant, colorant, processing modifier, inorganic filler, compatibilizer, foaming agent, foam nucleating agent, and antistatic agent may be added if needed. The outer layer 3 of the multi-layer insulated wire in FIG. 1 has been explained as having the single-layer structure. However, the structure is not limited to this, and may be a layered structure formed of a plurality of outer layers.

(Degree of Cross-Linkage)

The present inventors have found out that a pass rate for the vertical flame test (VFT) that is a test for the flame-retardant property in conformity with EN60332-1-2 tends to be higher as a degree of cross-linkage of the resin composition used for the outer layer 3 is lower. Further, the present inventors have found out that it is better to control the degree of cross-linkage so that the expansion start temperature of the resin composition used for the outer layer 3 is equal to or lower than 344° C. as an index of the flame-retardant property.

In this case, a cross-linkage method is not particularly limited, and may be performed as a publicly-known method such as a cross-linkage method with electron-beam irradiation, a hot vulcanization method, and a water cross-linkage method. Among these methods, the cross-linkage method with electron-beam irradiation is more preferable since its cross-linkage speed is high and since the degree of cross-linkage can be freely controlled by change in the irradiation level.

When the cross-linkage method with electron-beam irradiation is used for a resin composition to which the foaming agent has not been added, the irradiation level is exemplified to be regularly equal to or larger than 10 KGy and smaller than 70 KGy, preferably equal to or larger than 20 KGy and equal to or smaller than 65 KGy.

(Foaming Agent)

As described above, the flame retardant property of the multi-layer insulated wire can be improved by decreasing the degree of cross-linkage of the resin composition used for the outer layer 3 so that the expansion start temperature is equal to or lower than 344° C. However, in some cases, it is advantageous that the flame retardant property of the multi-layer insulated wire is improved while the certain degree of cross linkage is maintained.

For example, it is generally known that strength of a resin is increased by increase in the degree of cross-linkage of the resin composition. Therefore, strength of the outer layer 3 is increased by the increase in the degree of cross-linkage of the resin composition used for the outer layer 3. As a result, strengths such as the heat resistance property and the abrasion resistance property of the multi-layer insulated wire are increased.

The present inventors have found out that a unique effect can be obtained by adding the foaming agent to the resin composition used for the outer layer 3, the unique effect allowing the expansion start temperature to be maintained at 344° C. or lower even if the degree of cross-linkage is high so as to allow the insulated wire to pass the vertical flame test (VFT) that is the flame-retardant property test in conformity with EN60332-1-2.

As the foaming agent used for the present invention, an expandable graphite or others can be cited.

A content amount of the foaming agent is not particularly limited as long as the content amount allows the expansion start temperature of the resin composition used for the outer layer 3 to be at 344° C. or lower. However, for example, the content amount can be cited to be, for example, equal to or larger than 1 part by mass and equal to or smaller than 10 parts by mass per 100 parts by mass of the base polymer, preferably equal to or larger than 3 parts by mass and equal to or smaller than 8 parts by mass per the same, more preferably equal to or larger than 4 parts by mass and equal to or smaller than 6 parts by mass per the same.

As the irradiation level of the electron beam required when the foaming agent is used, the irradiation level can be cited to be, for example, equal to or larger than 70 KGy and equal to or smaller than 150 KGy, preferably equal to or larger than 75 KGy and equal to or smaller than 100 KGy.

(Expansion Start Temperature)

In the present invention, the expansion start temperature means a temperature at which increase in the storage elastic modulus starts when a temperature is increased with a predetermined temperature increase rate while a predetermined contact load is applied to the outer layer 3 to generate a predetermined skewness at a predetermined frequency.

Specifically, the expansion start temperature means a temperature at which the increase in the storage elastic modulus of the outer layer 3 starts in a condition in which the frequency is 10 Hz, the skewness is 1%, and the temperature increase rate is 55° C./min under the contact load of 1 N as described in the following practical examples.

In the present invention, the expansion start temperature of the resin composition used for the outer layer 3 is suppressed to be equal to or lower than 344° C., so that a multi-layer insulated wire having the excellent flame retardant property can be obtained.

An upper limit of the expansion start temperature is 344° C. In consideration of the flame retardant property, the upper limit is cited to be, for example, equal to or lower than 342° C., preferably equal to or lower than 340° C., and more preferably equal to or lower than 337° C.

A lower limit of the expansion start temperature is not particularly limited as long as being in a range in which the required flame retardant property is obtained. However, the lower limit is cited to be, for example, equal to or higher than 200° C., equal to or higher than 250° C., equal to or higher than 300° C., or others.

PRACTICAL EXAMPLE

Hereinafter, the present invention will be explained in more detail on the basis of practical examples and comparative examples. However, the present invention is not limited to these examples.

[Method of Producing Multi-Layer Insulated Wire]

The inner layer 2 was extruded and molded to a periphery of a tin-plated conductor 1 having an outer diameter of 1.23 mm (a stranded-wire conductor obtained by stranding 37 wires having an outer diameter of 0.18 mm) by using a 40-mm extruder, and the outer layer 3 was excluded and molded to a periphery of the inner layer 2. As a material of the inner layer 2, a previously-roll-kneaded resin composition having a blend shown in a table 1 was used. As a material of the outer layer 3, a previously-roll-kneaded resin composition having a blend shown in a table 2 was used. The extrusion and molding were performed so that thicknesses of the respective layers are 0.3 mm in the inner layer and 0.4 mm in the outer layer. Then, the cross-linkage was performed on the basis of the electron-beam irradiation, so that the multi-layer insulated wire 10 was produced.

[Method of Evaluating Flame Retardant Property]

For evaluation for the flame retardant property of the produced multi-layer insulated wire 10, the vertical flame test (VFT) was performed as the flame-retardant property test in conformity with EN60332-1-2. A multi-layer insulated wire 10 having a length of 600 mm was flamed for 60 seconds while the multi-layer insulated wire 10 is vertically kept. It was evaluated whether the flame is extinguished within 60 seconds after the flame is removed. After this test was performed three times, if the flame was extinguished within 60 seconds in all the three tests, the insulated wire was evaluated to pass (⊚) the test. If the flame was extinguished in two or less tests, the insulated wire was evaluated to fail (X) the test.

[Method of Evaluating Expansion Start Temperature]

Figure 2:
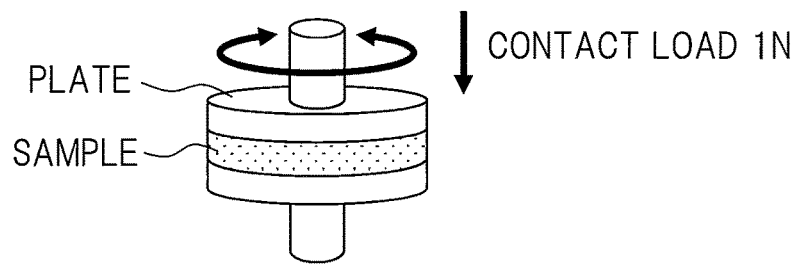
FIG. 2 is a schematic view of a measuring instrument for a storage elastic modulus in expansion start temperature evaluation.

Next, a method of evaluating the expansion start temperature of the resin composition used for the outer layer 3 will be described. A sheet sample pressed and molded to have a thickness of 1 mm after the roll kneading of the material with the blend shown in the table 2 was prepared. A Rheo meter MCR302 produced by the Anton Paar company was used as a measuring instrument to measure the temperature dependency of the storage elastic modulus from 70° C. to 530° C. A schematic view of the measuring instrument is shown in FIG. 2. As measuring conditions, a plate outer diameter was 25 mm, the temperature increase rate was 55° C./min., the skewness was 1%, the frequency was 10 Hz, and the contact load was 1N. As the plate, a parallel plate made of aluminum was used.

Figure 3:
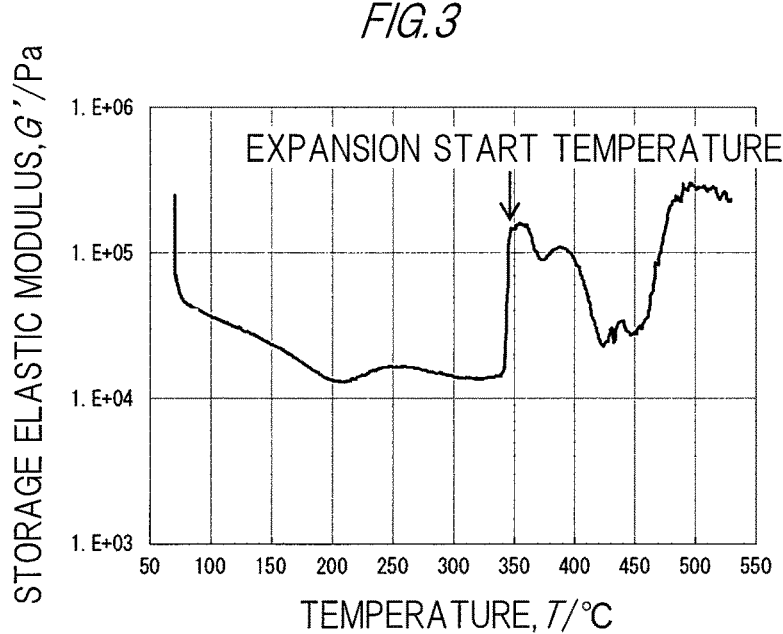
FIG. 3 is an example of a measuring result of temperature dependency of the storage elastic modulus according to the present invention.

In FIG. 3, a measurement result of the temperature dependency of the storage elastic modulus is shown. A sheet sample highly filled with a filler such as a flame retardant has a high stiffness, and therefore, does not completely adhere on the plate. Thus, it is known that a contact area between the sample and the plate is increased by foaming expansion of the sample in the test, which results in apparent increase in the storage elastic modulus. Accordingly, the evaluation was made so that a temperature at which the increase in this storage elastic modulus starts is regarded as the expansion start temperature.

|  |  | Used material | Unit | Practical examples 1 to 6, Comparative Example 1 |
|---|---|---|---|---|
| Blend amount of inner-layer material | Polymer | Polyethylene (SP1510, produced by Prime Polymer Co., Ltd.) | Parts by mass | 70 |
|  |  | Ethylene-butene copolymer (TAFMAR (registered mark) DF840, produced by Mitsui Chemicals, Inc.) | Parts by mass | 30 |
|  | Filler | Calcined clay (translink57, produced by Hayashi Kasei Co., Ltd.) | Parts by mass | 100 |
|  | Antioxidant | Composite-system antioxidant (AO-18, produced by ADEKA Corporation) | Parts by mass | 1 |

TABLE 2

|  |  | Used material | Unit | Practical example 1 | Practical example 2 | Practical example 3 | Practical example 4 | Practical example 5 | Practical example 6 | Comparative example 1 |
|---|---|---|---|---|---|---|---|---|---|---|
| Blend amount of outer-layer material | Polymer | Ethylene-vinyl acetate copolymer (EvaFlex 45X produced by Du Pont-Mitsui Polychemicals Co., Ltd. (VA amount 28%, MFR = 6)) | Parts by mass | 70 | 70 | 70 | 70 | 70 | 70 | 70 |
|  |  | Ethylene-vinyl acetate copolymer (EvaFlex 45X produced by Du Pont-Mitsui Polychemicals Co., Ltd. (VA amount 46%, MFR = 100)) | Parts by mass | 15 | 15 | 15 | 15 | 15 | 15 | 15 |
|  |  | Maleic anhydride modified ethylene-butene copolymer (TAFMAR (registered mark) MH7020 produced by Mitsui Chemicals, Inc.) | Parts by mass | 15 | 15 | 15 | 15 | 15 | 15 | 15 |
|  | Flame retardant | Magnesium hydroxide (Magseeds 54 produced by Konoshima Chemical Co., Ltd., (BET specific surface area 6 m²/g)) | Parts by mass | 200 | 200 | 200 | 150 | 250 | 200 | 200 |
|  | Foaming agent | Expandable graphite (CA-60 produced by Air Water Inc.) | Parts by mass |  |  |  |  |  | 5 |  |
|  | Antioxidant | Composite system antioxidant (AO-18 produced by ADEKA corporation) | Parts by mass | 1 | 1 | 1 | 1 | 1 | 1 | 1 |
|  | Colorant | FT carbon | Parts by mass | 2 | 2 | 2 | 2 | 2 | 2 | 2 |
|  | Lubricant | Zinc stearate | Parts by mass | 1 | 1 | 1 | 1 | 1 | 1 | 1 |
|  |  | Total | Parts by mass | 304 | 304 | 304 | 254 | 354 | 309 | 304 |

TABLE 2-continued

| Used material | | Unit | Practical example 1 | Practical example 2 | Practical example 3 | Practical example 4 | Practical example 5 | Practical example 6 | Comparative example 1 |
|---|---|---|---|---|---|---|---|---|---|
| Cross-linkage process | Electron-beam irradiation level | KGy | 35 | 55 | 65 | 55 | 55 | 75 | 75 |
| | Expansion start temperature | ° C. | 337 | 342 | 344 | 343 | 340 | 317 | 345 |
| Flame-retardant property evaluation | Vertical flame test (VFT) | | ◎ | ◎ | ◎ | ◎ | ◎ | ○ | X |

[Evaluation Result]

As shown in the table 2, the practical examples 1 to 5 passed the vertical flame test (VFT) so as to have good flame retardant property. In spite of usage of the magnesium hydroxide having the small BET specific surface area of 6 m²/g, the expansion start temperature was lowered to be equal to or lower than 344° C. since the irradiation level of the electron beams was set to be equal to or smaller than 65 KGy.

These results are not always limited by the following logics, but can be considered as follows. That is, it is considered that the degree of cross-linkage of the outer layer is suppressed by the small irradiation level of the electron beam, so that the expansion of the outer layer starts at the lower temperature. And, it is considered that, since the expansion of the outer layer material due to the dehydration of the metallic hydroxide of the flame retardant starts at the lower temperature, the heat transfer into the multi-layer insulated wire is suppressed, the combustion due to gasification of the inner layer material made of polyolefin is suppressed, and the flame-retardant property of the entire multi-layer insulated wire increases.

The comparative example 1 failed the vertical flame test (VFT). This could be because the electron-beam irradiation level that is equal to or larger than 75 KGy is too high for the resin composition to which the foaming agent was not added, and therefore, the excess cross-linkage reaction occurs to increase the expansion start temperature.

On the other hand, in spite of usage of the electron-beam irradiation level of 75 KGy as similar to the comparative example 1, the practical example 6 passed the vertical flame test (VFT). This could be because the expansion start temperature was lowered down to 317° C. since the foaming agent was added thereto, so that the high flame-retardant property was observed because of the same mechanism as described above.

As described above, it has been clear that the multi-layer insulated wire having the high flame-retardant property can be obtained by suppressing the expansion start temperature of the resin composition used for the outer layer of the multi-layer insulated wire so as to be equal to or lower than 344° C.

What is claimed is:

1. A multi-layer insulated wire comprising:
   a conductor;
   an inner layer formed in periphery of the conductor; and
   an outer layer formed in periphery of the inner layer,
   wherein the inner layer is made of a resin composition containing abase polymer containing polyolefin as a main component,
   the outer layer is made of a resin composition containing a base polymer containing polyolefin as a main component so as to contain 80 or more and 250 or less parts by mass of metallic hydroxide per 100 parts by mass of the base polymer, and
   an expansion start temperature of the outer layer is equal to or lower than 344° C.

2. The multi-layer insulated wire according to claim 1, wherein a BET specific surface area of the metallic hydroxide is equal to or larger than 1 m²/g and equal to or smaller than 10 m²/g.

3. The multi-layer insulated wire according to claim 1, wherein 1 or more and 10 or less parts by mass of a foaming agent per 100 parts by mass of the base polymer of the outer layer is contained.

4. The multi-layer insulated wire according to claim 3, wherein the foaming agent is an expandable graphite.

5. A method of manufacturing a multi-layer insulated wire comprising the steps of:
   in periphery of a conductor, forming an inner layer made of a resin composition containing a base polymer containing polyolefin as a main component;
   in periphery of the inner layer, forming an outer layer made of a resin composition containing a base polymer containing polyolefin as a main component so as to contain 80 or more and 250 or less parts by mass of metallic hydroxide per 100 parts by mass of the base polymer; and
   cross-linking the outer layer so that an expansion start temperature of the outer layer is equal to or lower than 344° C.

6. The method of manufacturing the multi-layer insulated wire according to claim 5,
   wherein, in the step of cross-linking the outer layer, the outer layer is irradiated with electron beam whose irradiance level is equal to or higher than 20 KGy and lower than 70 KGy.

7. A method of manufacturing a multi-layer insulated wire comprising the steps of:
   in periphery of a conductor, forming an inner layer made of a resin composition containing a base polymer containing polyolefin as a main component;
   in periphery of the inner layer, forming an outer layer made of a resin composition containing a base polymer containing polyolefin as a main component so as to contain 80 or more and 250 or less parts by mass of metallic hydroxide per 100 parts by mass of the base polymer and so as to contain 1 or more and 10 or less parts by mass of a foaming agent per 100 parts by mass of the base polymer; and
   cross-linking the outer layer so that an expansion start temperature of the outer layer is equal to or lower than 344° C.

8. The method of manufacturing the multi-layer insulated wire according to claim 7, wherein, in the step of cross-linking the outer layer, the outer layer is irradiated with electron beam whose irradiance level is equal to or higher than 70 KGy and equal to or lower than 150 KGy.

* * * * *